United States Patent [19]

Kawamura

[11] Patent Number: 4,858,825

[45] Date of Patent: Aug. 22, 1989

[54] CONTROL SYSTEM FOR QUICK HEATER

[75] Inventor: Hideo Kawamura, Kanagawa, Japan

[73] Assignee: Isuzu Motors Limited, Tokyo, Japan

[21] Appl. No.: 898,189

[22] Filed: Aug. 20, 1986

[30] Foreign Application Priority Data

Aug. 23, 1985 [JP] Japan ................................ 60-185594

[51] Int. Cl.[4] ............................................. G05D 23/00

[52] U.S. Cl. .................................... 237/2 A; 219/490; 237/12.3 C

[58] Field of Search ............. 237/2 A, 12.3 C, 12.3 B, 237/12.3 C, 12.3 R; 123/179 H, 145 A; 219/492, 490, 481

[56] References Cited

U.S. PATENT DOCUMENTS

| | | | |
|---|---|---|---|
| 4,411,385 | 10/1983 | Lamkewitz | 237/12.3 C |
| 4,500,775 | 2/1985 | Sangu et al. | 123/179 H |

*Primary Examiner*—Henry A. Bennett

*Attorney, Agent, or Firm*—Staas & Halsey

[57] ABSTRACT

A quick heatng burner for burning fuel is disposed in the intake pipe of a gasoline engine or a diesel engine, and a heat exchanger is positioned downstream of the burner. Heat generated by the heat exchanger is utilized to heat the interior of the passenger compartment of a motor vehicle. Operation of the burner and the heat exchanger is monitored by an electronic controller, which generates an alarm and stops the burner and the heat exchanger when they fail.

10 Claims, 3 Drawing Sheets

CONTROL SYSTEM FOR QUICK HEATER

CROSS-REFERENCE TO RELATED APPLICATION

This application is related to U.S. Application Ser. No. 870,876, filed June 5, 1986, and assigned to the assignee of the subject application.

BACKGROUND OF THE INVENTION

The present invention relates to a control system for a quick heater for quickly heating the interior of the passenger compartment of a motor vehicle which is driven by an internal combustion engine. More particularly, the present invention relates to a quick heater control system for monitoring the operating conditions of various operating components of a quick heater and detecting a failure of any of the operating components to stop the, operation of the quick heater and/or issue an alarm.

There have been proposed various conventional heaters for heating the passenger compartments of motor vehicles. According to one heater design, cooling water is extracted from the internal combustion engine through a hot-water pipe and passed through a heater body comprising a heater core and a blower, air is supplied to and heated by the heater body, and the heated air is delivered into the passenger compartment to heat the interior thereof. Another prior motor vehicle heater includes a burner for burning fuel independently of the internal combustion engine, the heat generated by the burned fuel being utilized to heat the interior of the compartment.

The heater which utilizes the engine cooling water is not suitable for quickly heating the interior of the compartment since since it takes a long time to increase the temperature of the cooling water. One problem with a heater employing fuel independently of the internal combustion engine and using a burned gas itself for heating the interior of a compartment is that the hot air produced by the burner for heating the compartment interior cannot be controlled as desired. Although the burner heater is capable of quickly heating the compartment interior, of controlling the heating hot-air sufficiently, and of heating the compartment interior according to a desired heating position, it fails to sufficiently detect and indicate failures of various components of the heater.

SUMMARY OF THE INVENTION

It is an object of the present invention to provide a control system for a quick heater for quickly heating the interior of the passenger compartment of a motor vehicle, the control system being capable of detecting failures of various components of the heater to stop the operation of the heater.

Another object of the present invention is to provide a control system for a quick heater for quickly heating the interior of the passenger compartment of a motor vehicle, the control system being capable of detecting failures of various components of the heater to issue failure alarms.

Still another object of the present invention is to provide a control system for a quick heater for quickly heating the interior of the passenger compartment of a motor vehicle, the control system being capable of detecting failures of various components of the heater to stop the operation of the heater and issue failure alarms.

According to the present invention, there is provided a control system for a quick heater including a quick heating burner for atomizing fuel in an atomizer plug, mixing air with the atomized fuel, and igniting the mixture with an ignition plug to burn the mixture, and a heat exchanger for supplying, through a heat exchange, heat from the burned mixture to the heater, the control system having operation detecting means for detecting operation of the quick heating burner and the heat exchanger to generate detected signals, and means for stopping operation of the quick heater in response to the detected signals from the operation detecting means.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
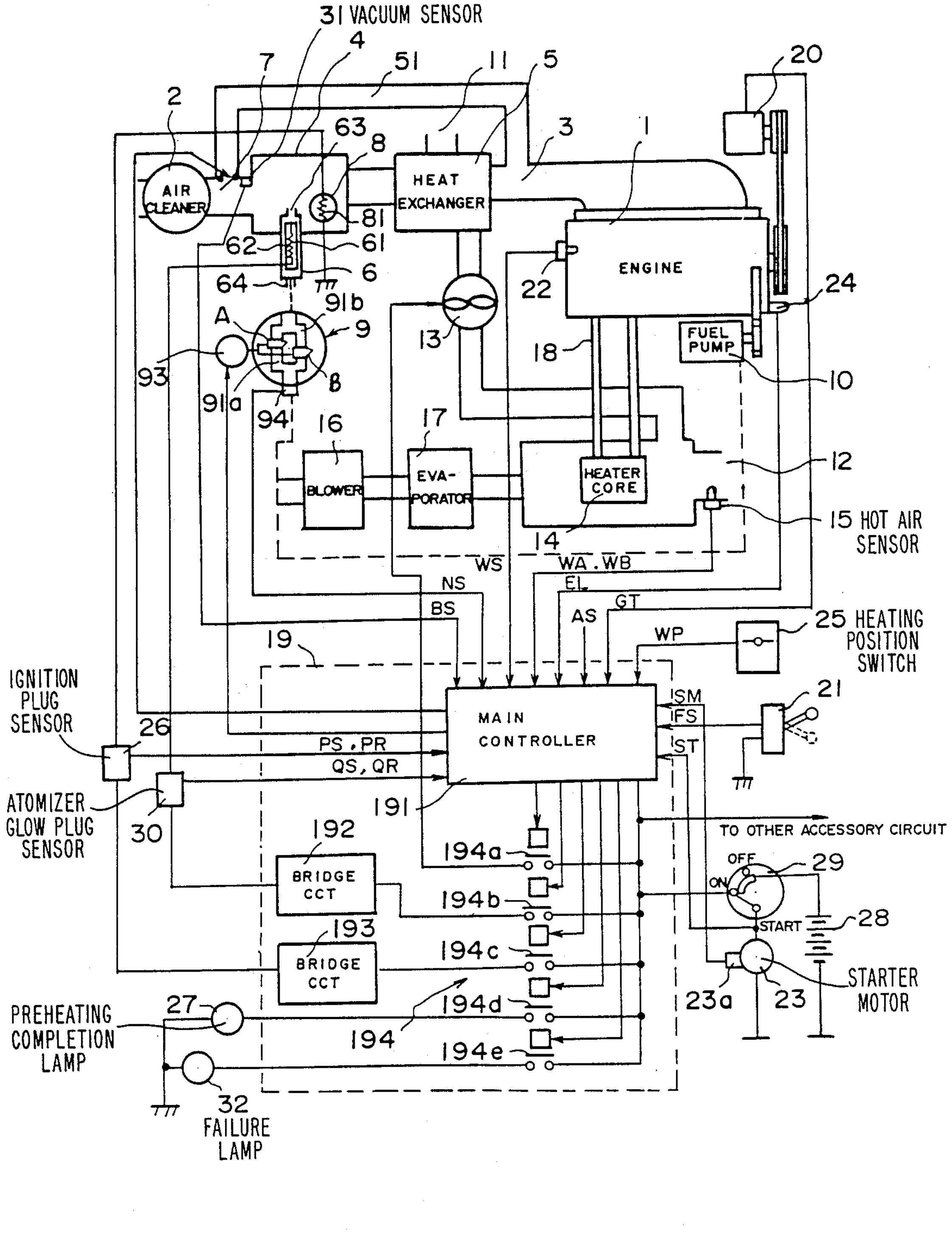
FIG. 1 is a block diagram of a control system for a quick heater according to an embodiment of the present invention.

An embodiment of the present invention will hereinafter be described in detail with reference to the drawings.

An engine 1 which may be a diesel engine or a gasoline engine is associated with a quick heating burner 4 for burning fuel to heat the interior of a passenger compartment, the quick heating burner 4 being disposed in an intake pipe 3 serving as an air duct extending from an air cleaner 2. A heat exchanger 5 is connected to the intake pipe 3 downstream of the quick heating burner 4 in the direction of air flow through the intake pipe 3. A bypass passage 51 is connected to the intake pipe 3 for supplying air to the engine 1 to burn fuel therein.

The quick heating burner 4 has therein an atomizer 6 for heating fuel to atomize the same, a bypass valve 7 for controlling an air inlet port for supplying air to be mixed with atomized fuel into a combustible mixture, and an ignition glow plug 8 for igniting and burning the combustible mixture. The atomizer 6 has a pipe-shaped or rod-shaped atomizer glow plug 61 of a ceramic material for heating the fuel to atomize the same. The glow plug 61 includes a central resistor wire 62 having a positive temperature coefficient for heating the glow plug 61 upon energization. The ignition glow plug 8 is also in the form of a pipe or rod made of a ceramic material such as silicon nitride ($Si_3N_4$) and includes a central resistor wire 81 for heating the ignition glow plug 8 upon energization.

In one end of the atomizer 6, there is defined an ejector hole 63 for ejecting fuel as it is heated and atomized by the atomizer glow plug 61 into the quick heating burner 4. The other end of the atomizer 6 has a fuel inlet hole 64 communicating with a fuel supply unit 9 having a fuel valve. The bypass valve 7 which serves as means for controlling the air inlet port to supply air to be mixed with atomized fuel is controlled by a command from a main controller 191 (described below). When the bypass valve 7 is fully opened, air to be mixed is not introduced and bypasses the quick heating burner 4. When the bypass valve 7 is opened to a degree "1", it introduces a predetermined small amount of air. When the bypass valve 7 is opened to a degree "2", it introduces a predetermined medium amount of air. When the bypass valve 7 is opened to a degree "3", it introduces a predetermined large amount of air. In the absence of any command from the main controller 191, the bypass valve 7 is opened to the degree "1". A vacuum sensor 31 is disposed downstream of the bypass valve 7 in the direction of air flow and serves as means for detecting a vacuum developed by the operation of the bypass valve 7. The vacuum sensor 31 issues a vacuum signal BS to the main controller 191.

The fuel supply unit 9 which supplies fuel from a fuel pump 10 to the atomizer 6 includes two fuel passages 91*a*, 91*b* having fuel valves A, B, respectively, that are openable and closable by a drive source 93. The fuel passage 91*b* is arranged to supply a greater amount of fuel than the fuel passage 91*a*. It is possible to open both of the fuel passages 91*a*, 91*b* to increase the amount of fuel supplied. A fuel pressure sensor 94 serving as means for detecting the pressure in the fuel path, is disposed in the fuel inlet port of the fuel supply unit 9, the fuel pressure sensor 94 applying a pressure signal NS to the main controller 191.

The quick heating burner 4 operates as follows: Fuel delivered from the fuel passage 91*a* or 91*b* into the atomizer 6 is heated by the atomizer glow plug 61 as the fuel passes through the atomizer 6, and is then ejected as atomized fuel from the ejector hole 63 into the quick heating burner 4. The atomized fuel is mixed with air coming from the air cleaner 2 through the bypass valve 7 to form a combustible mixture, which is ignited by the ignition glow plug 8 into a high-temperature burned gas that is fed to the heat exchanger 5.

The heat exchanger 5 is connected to a blower 13 which introduces fresh air from an air inlet port 11 communicating with the interior of the passenger compartment of an automobile into the heat exchanger 5 in which the air is heated by the burned gas from the quick heating burner 4, and delivers the hot air from the heat exchanger 5 to an air outlet port 12. The air outlet port 12 opens into a cooling water heater core 14 which is separately provided for heating the interior of the passenger compartment. A hot air sensor 15 serving as means for detecting the temperature and rate of flow of the hot air being discharged from the air outlet port 12 is positioned in the open end of the air outlet port 12. A blower 16, an air-conditioning evaporator 17, and a hot water passage 18 constitute a heater device which utilizes engine cooling water.

A controller 19 comprises:

(1) the main controller 191 receptive of a generation signal GT from a generator 20 driven by the engine 1, an ON/OFF signal FS from an operation switch 21, a water temperature signal WS from a water temperature switch 22 which detects the temperature of the cooling water for the engine 1, a start position signal ST, a rotation signal SM from a rotation switch 23*a* which detects rotation of a starter motor 23, an accelerator opening signal AS, a vacuum signal BS from the vacuum sensor 31 disposed upstream of the quick heating burner 4, a load signal EL from an engine load sensor 24 which detects a load on the engine 1, a pressure signal NS from the fuel pressure sensor 94 which detects the fuel path pressure in the fuel inlet port of the fuel supply unit 9, a hot air signal WA and an air rate signal WB from the hot air sensor 15 in the air outlet port 12, a heating signal WP from a heating position control 25 which is operated by the driver, an ignition plug temperature signal PS and a resistance signal PR from an ignition plug sensor 26 which detects the temperature and resistance of the ignition glow plug 8, and an atomizer plug temperature signal QS and a resistance signal QR from an atomizer glow plug sensor 30 which detects the temperature and resistance of the atomizer glow plug 61;

(2) a bridge circuit 192 for controlling the atomizer glow plug 61 at a temperature at which the fuel is atomized;

(3) a bridge circuit 193 for controlling the ignition glow plug 8 at a temperature at which the mixture of atomized fuel and air is ignited; and (4) a switch assembly 194.

The main controller 191 comprises a computer having a processing unit, a memory, and an input/output interface.

The bridge circuit 192 is in the form of a Wheatstone bridge comprising the resistor wire 62 for heating the atomizer glow plug 61 in one arm and three resistors in the other three arms, and includes a comparator for detecting a balanced condition of the Wheatstone bridge, and a relay which is operated by an output from the comparator. By energizing and de-energizing the resistor wire 62 through the relay, the bridge circuit 192 controls the atomizer glow plug 61 at a fuel atomizing temperature such as about 500° C., for example. The bridge circuit 193 is similarly in the form of a Wheatstone bridge comprising the resistor wire 81 for heating the ignition glow plug 8 in one arm and three resistors in the other three arms, and includes a comparator for detecting a balanced condition of the Wheatstone bridge, and a relay which is operated by an output from the comparator. By energizing and de-energizing the resistor wire 81 through the relay, the bridge circuit 193 controls the ignition glow plug 8 at a temperature to ignite the mixture of atomized fuel and air.

The switch assembly 194 has a switch 194*a* for controlling the turn-on and turn-off of the blower 13, a switch 194*b* for controlling the power supply to the bridge circuit 192, a switch 194*c* for controlling the power supply to the bridge circuit 193, a switch 194*d* for controlling the power supply to a preheating completion lamp 27, and a switch 194*e* for controlling the power supply to a failure lamp 32. The control system of FIG. 1 also includes a power supply battery 28 and a key switch 29. The failure lamp 32 serving as means for issuing a failure alarm is energized when any one of the ignition glow plug 8, the atomizer 6, the blower 13, the bypass valve 7, and the fuel valves A, B is subjected to a failure.

Figure 2A:
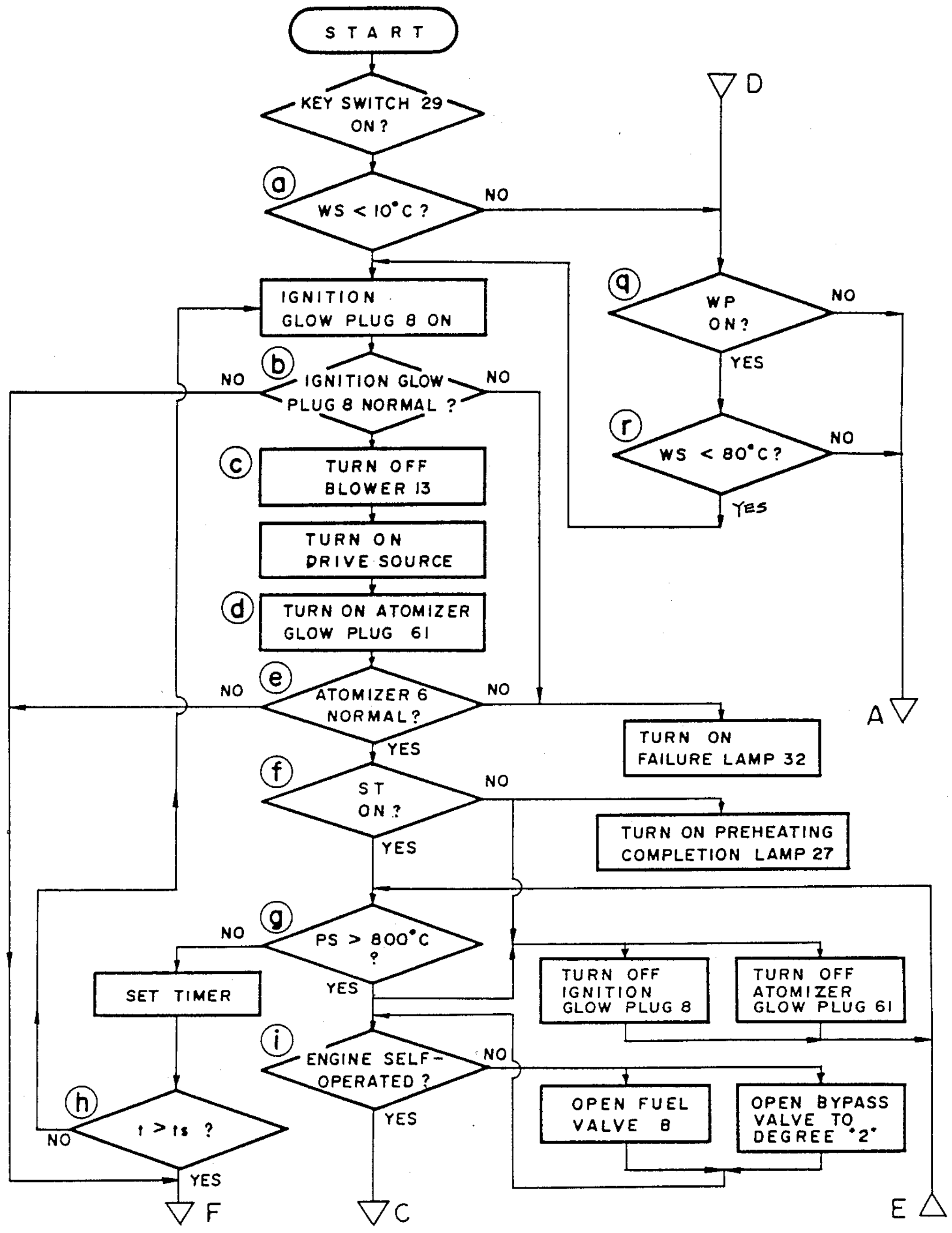
FIGS. 2A and 2B form a flowchart of an operation sequence of the control system of the present invention.
Figure 2B:
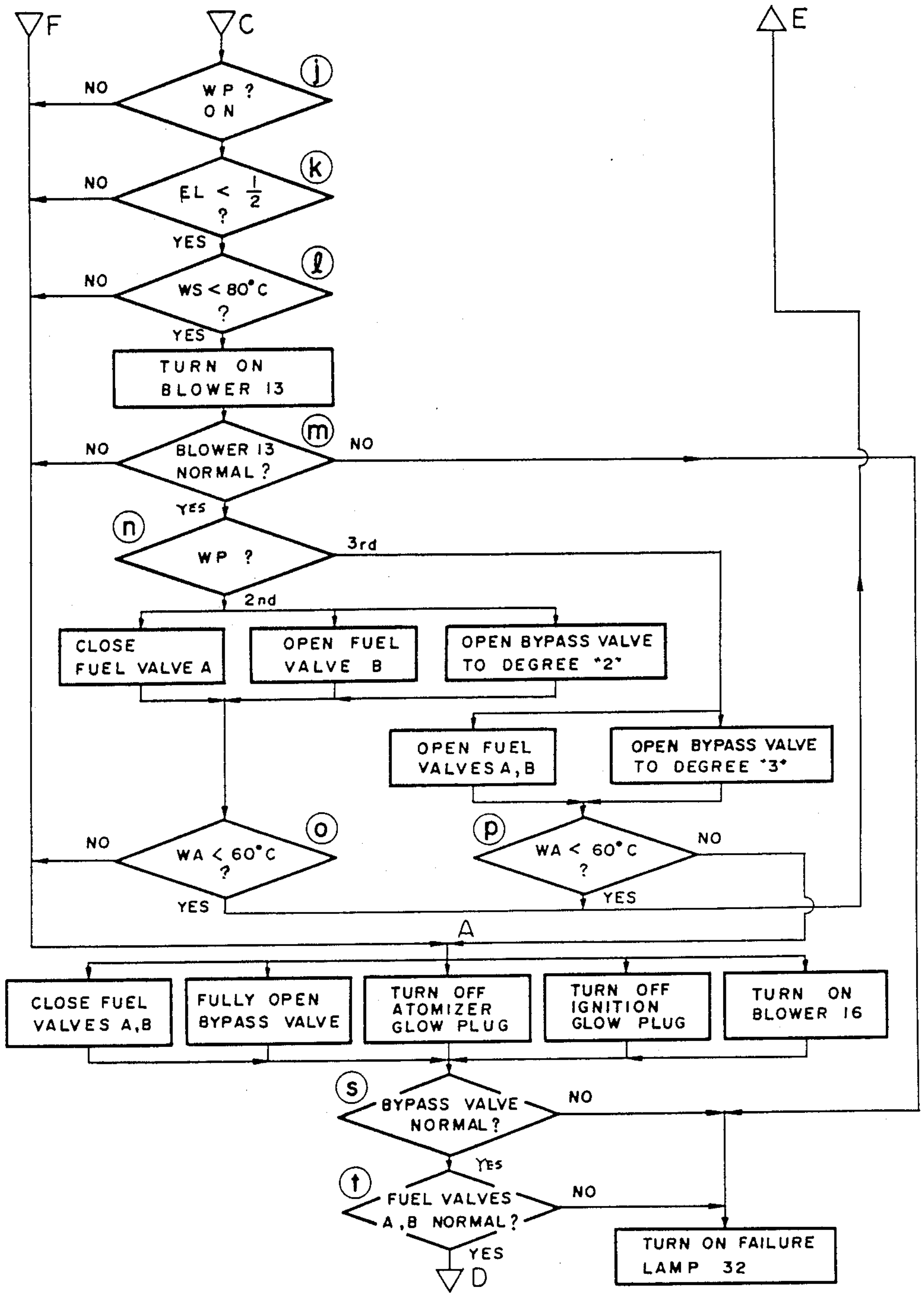

An operation sequence of the control system of FIG. 1 for the quick heating burner will be described with reference to FIGS. 2A and 2B.

When the key switch 29 is turned on, the electric power is supplied to the main controller 191 and other accessory circuits. The main controller 191 first determines in a step a whether the cooling water temperature indicated by the water temperature signal WS from the water temperature switch 22 has reached 10° C. If the cooling water temperature is below 10° C., then the quick heating burner 4 is put into operation as a device for assisting the engine 1 in getting started. The main controller 191 closes the switch 194*c* to enable the bridge circuit 193 to energize the ignition glow plug 8.

If the energization of the ignition glow plug 8 is judged in a step b as being normal based on the resistance signal PR from the ignition plug sensor 26, then control goes to a step c which turns off the switch 194*a* to de-energize the blower 13. The main controller 191 then applies a command to the drive source 93 for the fuel supply unit 9 to operate the fuel value A to supply fuel to the atomizer 6. Then, the switch 194*b* is closed to enable the bridge circuit 192 to energize the atomizer glow plug 61 in a step d. If the energization of the ignition glow plug 8 is judged in step b as being abnormal based on the resistance signal PR from the ignition plug sensor 26, then the switch 194*e* is closed to energize the failure lamp 32 to give a failure alarm and stop operating the quick heating burner 4.

When the atomizer glow plug 61 has been energized in step d, if the resistance signal QR from the atomizer plug sensor 30 is normal in a step e, then control proceeds to a step f. If the atomizer glow plug 61 is broken, for example, the resistance signal QR indicates a failure, and the switch 194*e* is closed to energize the failure lamp 32 to give a failure alarm and stop operating the quick heating burner 4.

Step f checks the start position signal ST from the key switch 29. If the key switch 29 is in a start position, then the above operation is continued. If the key switch 29 is in the ON position, but not in the start position, then the switch 194*d* is closed for a few seconds to energize the preheating completion lamp 27, indicating the completion of preheating to the driver. Then, the atomizer glow plug 61 and the ignition glow plug 8 are de-energized.

If the key switch 29 is in the start position, thus energizing the starter motor 23 to rotate the same, then the rotation signal SM from the rotation switch 23*a* is received by the main controller 191, which checks the temperature of the ignition glow plug 8 in a step g. More specifically, when the bridge circuit 193 is energized, the temperature of the ignition glow plug 8 is kept at a prescribed temperature, for example about 800° C. If the fuel in the quick heating burner 4 is burned sufficiently, the temperature in the quick heating burner 4 is higher than the above prescribed temperature, and can be detected by checking the resistance of the resistor wire 81 which has a positive temperature coefficient. The plug temperature signal PS from the ignition plug sensor 26 which has such a temperature detecting capability is applied to the main controller 191. If the detected temperature of the ignition glow plug 8 is higher than 800° C., then the main controller 191 determines that the fuel combustion in the quick heating burner 4 is sufficient, and enables the switches 194*c*, 194*b* to de-energize the ignition glow plug 8 and the atomizer glow plug 61, respectively. If the detected temperature of the ignition glow plug 8 is lower than 800° C., then a program timer in the main controller 191 is set. If the timer has not reached a predetermined time ts in a step h, then control returns to the routine to energize the ignition glow plug 8 for supplying fuel and energizing the atomizer glow plug 61 to burn the fuel again. If the condition in which the temperature of the ignition glow plug 8 is below 800° C. continues for the time ts, then the operation of the quick heating burner 4 is interrupted.

If the temperature of the ignition glow plug 8 is higher than 800° C., control goes from step g to a step i which ascertains whether the engine 1 operates by itself. If not, then the main controller 191 opens the fuel valve B which supplies a larger amount of fuel and also opens the bypass valve 7 to the degree "2" to supply an increased amount of air, so that fuel combustion is increased to deliver a larger amount of hot air to assist the engine 1 to get started. If the engine 1 operates by itself, a step j checks the position indicated by the heating signal WP from the heating position switch 25. If the heating signal WP is ON, a step k checks the load signal EL from the load sensor 24 to check the load on the engine 1. If the engine load is light or smaller than ½ and the water temperature signal WS from the water temperature switch 22 is less than 80° C. in a step 1, then the main controller 191 enables the switch 194*a* to energize the blower 13 to deliver hot air from the heat exchanger 5 through the air outlet port 12 into the passenger compartment to start heating the interior thereof. If the air rate signal WB from the hot air sensor 15 indicates an abnormal condition, the main controller 191 determines that the blower 13 or its associated system is subjected to a failure in a step m, followed by energization of the failure lamp 32 to give a failure indication and stopping operation of the quick heating burner 4. If the heating signal WP is OFF in step j, or if the engine load is greater than ½ in step k, or if the cooling water temperature is higher than 80° C. in step 1, then the fuel valves A, B are closed in order to stop the operation of the quick heating burner 4, the bypass valve 7 is fully opened to allow air to bypass the quick heating burner 4, and the atomizer glow plug 61 and the ignition glow plug 8 are de-energized. If the temperature of the cooling water is higher than 80° C., then the conventional heater system utilizing the cooling water can be used, and the blower 16 is energized to get the conventional heater system into operation.

If the heating signal WP from the heating position switch 25 indicates a second position in a step c after the hot air from the heat exchanger 5 has started heating the interior of the passenger compartment, the fuel valve A is closed and the fuel valve B is opened to increase the amount of fuel combusted, and the bypass valve 7 is opened to the degree "2" to increase the amount of air, so that the amount of fuel combustion is increased. If the heating signal WP indicates a third position in step n, then both of the fuel valves A, B are opened and the bypass valve 7 is opened to the degree "3" for thereby increasing the amount of fuel combustion to generate a larger amount of heat.

If the hot air signal WA from the hot air sensor 15 which detects the temperature of the hot air from the air outlet port 12 indicates a temperature higher than 60° C. in a step o or p, then the fuel valves A, B are closed to stop the operation of the quick heating burner 4, the bypass valve 7 is fully opened, and the atomizer glow plug 61 and the ignition glow plug 8 are de-energized. If the hot air signal WA indicates a temperature lower than 60° C. in the step o or p, and upon elapse of a prescribed period of time, then control returns to step g to check the temperature of the ignition glow plug 8 for the burning condition in the quick heating burner 4, followed by the respective routines described above.

If the water temperature signal WS indicates a temperature higher than 10° C. in the step a, the heating signal WP is checked in a step q. If the heating temperature WP is ON or indicates a heating position, then the water temperature signal WS is checked in a step r. If the cooling water temperature is lower than 80° C., then control goes to the routine (from the answer YES of step a) for operating the quick heating burner 4. If the heating signal WP is not in the heating position in the step q or if the water temperature signal WS indicates a cooling water temperature higher than 80° C. in step r, then operation of the quick heating burner 4 is not necessary, and the combustion in the quick heating burner 4 is stopped.

Upon elapse of a given period of time, control proceeds to a point D for detecting the heating signal WP, during which time operation of the bypass valve 7 is detected in a step s and operation of the fuel valves A, B is detected in a step t.

Step s ascertains whether the bypass valve 7 is opened or closed on the basis of the vacuum signal BS from the vacuum sensor 31. If the bypass valve 7 operates normally under a command from the main controller 191, the vacuum signal BS is commensurate with the opening of the bypass valve 7. If the vacuum signal BS indicates an abnormal condition, the main controller 191 closes the switch 194e to energize the failure lamp 32.

Step t detects operation of the fuel valves A, B based on the pressure signal NS from the fuel pressure sensor 94 in the fuel supply unit 9. If the fuel valves A, B operate normally, the pressure signal NS is proportional to the opening of these fuel valves A, B and gives a basis for ascertaining whether the fuel valves A, B function normally. If the pressure signal NS is indicative of an abnormal condition, the failure lamp 32 is energized to give a failure alarm.

If the bypass valve 7 and the fuel valves A, B are normal, then control goes to the point D from which it proceeds to step q for checking the heating signal WP from the heating position switch 25.

In the above embodiment, the quick heating burner and the heat exchanger are disposed in the intake pipe 3 of the gasoline or diesel engine. However, the quick heating burner may be separated from the intake pipe of the engine, and hot air from the heat exchanger may be introduced into the passenger compartment for heating the interior thereof. For example, the quick heating burner may be positioned outside of an engine compartment and placed below the driver's seat. If a trailer is pulled by the automobile, then the quick heating burner may be disposed beneath the floor of the trailer.

Although a certain preferred embodiment has been shown and described, it should be understood that many changes and modifications may be made therein without departing from the scope of the appended claims. As an example, a failure of the fuel valves may be detected by means of a change in the temperature of the atomizer glow plug.

What we claim is:

1. A motor vehicle heater, mounted in a motor vehicle having an engine, for heating the passenger compartment of the motor vehicle, comprising:
   means for supplying fuel;
   a quick heating burner including:
   an atomizer plug for atomizing the fuel, said atomizer plug being heated by electric power;
   means for mixing air with the atomized fuel; and
   an ignition plug for igniting the mixture of air and atomized fuel so that the mixture is burned, said ignition plug being heated by electric power;
   means for transferring heat from the ignited mixture to the passenger compartment of the motor vehicle;
   operation detecting means for detecting operation of said quick heating burner and said means for transferring heat, and for generating detection signals, said operation detection means including:
   means for detecting whether said ignition plug has failed based on the electrical resistance of said ignition plug, and for generating a first ignition plug detection signal; and
   means for detecting whether said atomizer plug has failed based on the electrical resistance of said atomizer plug, and for generating a first atomizer plug detection signal; and
   means for stopping the operation of said quick heating burner in dependence upon the detection signals generated by said operation detecting means.

2. A motor vehicle heater according to claim 1, wherein said operation detecting means further comprises:
   means for detecting an abnormal supply of fuel to said atomizer plug and for generating a fuel supply detection signal;
   means for detecting an abnormal air supply to said quick heating burner and for generating an air supply detection signal; and
   means for detecting an abnormal supply of heat from said means for transferring heat.

3. A motor vehicle heat exchanger according to claim 1, wherein said operation detecting means comprises:
   means for detecting the temperature of said ignition plug and for generating a second ignition plug detection signal; and
   means for detecting the temperature of said atomizer plug and for generating a second atomizer plug detection signal.

4. A motor vehicle heater according to claim 3, wherein said operation detection means further comprises:
   means for detecting the supply of fuel by said means for supplying fuel and for providing a fuel supply detection signal; and
   means for detecting the heat transferred to the passenger compartment of the motor vehicle and for generating a heat detection signal.

5. A motor vehicle heater according to claim 4, wherein said means for stopping operation of said quick heater comprises means for stopping operation of said quick heater in dependence upon the first and second ignition plug detection signals, the first and second atomizer plug detection signals, the fuel supply detection signal and heat detection signal.

6. A method of controlling a motor vehicle heater, mounted in a motor vehicle having an engine, for heating the passenger compartment of the motor vehicle, the motor vehicle heater including a quick heating burner for atomizing fuel with an atomizer plug, for mixing air with the atomized fuel, and for igniting the mixture with an ignition plug to burn the mixture, and a heat exchanger for supplying, through heat exchange, heat from the burned mixture to the passenger compartment of the motor vehicle, said method comprising the steps of:
   (a) detecting the electrical resistance of the ignition plug;
   (b) detecting the electrical resistance of the atomizer plug; and
   (c) automatically stopping the operation of the quick heater when the results of said detection step (a) or said detection step (b) indicate that the ignition plug or the atomizer plug has failed.

7. A control system for a quick heater having a burner including an igniting device for igniting fuel, and a heat exchanger for exchanging heat between heating air and combustion gases produced by burning the fuel with the burner, said control system comprising:

an atomizing glow plug, heatable by electric power supplied thereto, for atomizing the fuel before it is ignited by the igniting device;

detecting means for detecting the electrical resistance of said atomizing glow plug and for generating a detection signal representative of the detected electrical resistance;

means for determining whether said atomizing glow plug fails based on the detection signal from said detecting means; and means for stopping operation of said quick heater based on the result of the determination of said determining means.

8. A control system according to claim 7, further including alarm means for generating an alarm signal based on the result of the determination by said determining means.

9. A control system for a quick heater having a burner for burning fuel and including an atomizing device for atomizing fuel, and a heat exchanger for exchanging heat between heating air and combustion gases produced by burning the fuel with the burner, said control system comprising:

an igniting glow plug for igniting the fuel which has been atomized by the atomizing device, said igniting flow plug being heated by electric power supplied thereto;

detecting means for detecting the electrical resistance of said igniting glow plug and for generating a detection signal representative of the detected electrical resistance;

means for determining whether said igniting flow plug fails based on the detection signal from said detecting means; and means for stopping operation of said quick heater based on the result of the determination by said determining means.

10. A control system according to claim 9, further including alarm means for generating an alarm signal based on the result of the determination by said determining means.

* * * * *

UNITED STATES PATENT AND TRADEMARK OFFICE

CERTIFICATE OF CORRECTION

PATENT NO. : 4,858,825

DATED : AUGUST 22, 1989

INVENTOR(S) : HIDEO KAWAMURA

It is certified that error appears in the above-identified patent and that said Letters Patent is hereby corrected as shown below:

Col. 1, line 20, "the," should be --the--;
line 37, delete "since" (second occurrence).

Col. 5, line 7, "value" should be --valve--.

Col. 6, line 36, "step c"should be --step n--.

Signed and Sealed this

Nineteenth Day of June, 1990

*Attest:*

HARRY F. MANBECK, JR.

*Attesting Officer*

*Commissioner of Patents and Trademarks*